(12) United States Patent
Ahdoot et al.

(10) Patent No.: US 11,150,032 B2
(45) Date of Patent: Oct. 19, 2021

(54) TRANSIENT HEAT ABSORPTION AND DELAYED DISSIPATION BY HIGH HEAT CAPACITY MATERIAL

(71) Applicant: BIGZ TECH INC., Montréal (CA)

(72) Inventors: Eliot Ahdoot, Dollard-des-Ormeaux (CA); Simon Ahdoot, Toronto (CA)

(73) Assignee: BIGZ TECH INC., Montreal (CA)

( * ) Notice: Subject to any disclaimer, the term of this patent is extended or adjusted under 35 U.S.C. 154(b) by 91 days.

(21) Appl. No.: 16/474,288

(22) PCT Filed: Jan. 15, 2018

(86) PCT No.: PCT/CA2018/050037
§ 371 (c)(1),
(2) Date: Jun. 27, 2019

(87) PCT Pub. No.: WO2018/132896
PCT Pub. Date: Jul. 26, 2018

(65) Prior Publication Data
US 2019/0339025 A1 Nov. 7, 2019

Related U.S. Application Data

(60) Provisional application No. 62/447,601, filed on Jan. 18, 2017.

(51) Int. Cl.
*F28D 20/00* (2006.01)
*F24F 13/30* (2006.01)
(Continued)

(52) U.S. Cl.
CPC .......... *F28D 20/0056* (2013.01); *F24F 13/30* (2013.01); *F24D 11/002* (2013.01);
(Continued)

(58) Field of Classification Search
CPC ................ F28D 20/0056; F28D 20/02; F28D 2020/0073; F28D 2020/0095;
(Continued)

(56) References Cited

U.S. PATENT DOCUMENTS 2,856,506 A 10/1958 Telkes
3,640,090 A * 2/1972 Ares .................... F28D 15/0275
62/436

(Continued)

FOREIGN PATENT DOCUMENTS

CA 2433925 6/2011
GB 1566411 4/1980
(Continued)

*Primary Examiner* — Harry E Arant
(74) *Attorney, Agent, or Firm* — Benoit & Cote Inc.; Charles-André Caron

(57) ABSTRACT

There is described an apparatus for storing heat. The apparatus comprises a thermal mass for storing heat, the thermal mass having a first surface and a second surface. Fins are provided on the first surface and the second surface for accelerating heat transfer to and from the thermal mass. A displacement mechanism is secured to the thermal mass for translating the first surface to a first environment, e.g., a duct, while removing the second surface and its fins from a second environment, e.g., outside, and for translating the second surface to the second environment while removing the first surface and its fins from the first environment.

10 Claims, 11 Drawing Sheets

(51) Int. Cl.
*F24D 11/00* (2006.01)
*F24H 7/02* (2006.01)
*F28D 20/02* (2006.01)

(52) U.S. Cl.
CPC ........ *F24H 7/0216* (2013.01); *F24H 2250/00* (2013.01); *F28D 20/02* (2013.01)

(58) Field of Classification Search
CPC . F24D 11/002; F24F 5/00; F24F 13/30; F24S 60/00; F24S 2020/23; F24S 30/20; Y02E 60/145; Y02E 60/142; Y02E 10/40; F24H 7/0216; F24H 2250/00
See application file for complete search history.

(56) References Cited

U.S. PATENT DOCUMENTS

| | | | |
|---|---|---|---|
| 4,051,890 A * | 10/1977 | Melchior | F24S 10/00 165/276 |
| 4,177,861 A * | 12/1979 | Costello | F28F 27/02 165/296 |
| 4,270,512 A | 6/1981 | Van Der Maas | |
| 6,119,767 A * | 9/2000 | Kadota | F28D 15/0233 165/104.33 |
| 7,077,124 B2 | 7/2006 | Szymocha | |
| 8,827,779 B2 | 9/2014 | Hollick | |
| 2002/0007637 A1* | 1/2002 | Simmons | F25D 31/002 62/6 |
| 2006/0196632 A1* | 9/2006 | Kudo | F28D 20/02 165/10 |
| 2009/0236071 A1* | 9/2009 | Jensen | F28D 9/0062 165/10 |
| 2012/0048259 A1 | 3/2012 | Wagner | |
| 2016/0163945 A1 | 6/2016 | Ahdoot | |
| 2016/0288928 A1* | 10/2016 | Smith | F28D 15/04 |
| 2016/0290737 A1 | 10/2016 | Cox | |
| 2016/0329480 A1 | 11/2016 | Ahdoot | |
| 2018/0054156 A1* | 2/2018 | Lokey | F24S 40/85 |
| 2018/0155126 A1* | 6/2018 | Weiske | H01L 21/67709 |

FOREIGN PATENT DOCUMENTS

| | | |
|---|---|---|
| JP | 11182873 | 7/1999 |
| JP | 4861041 | 1/2012 |
| WO | 2011028834 | 3/2011 |

* cited by examiner

TRANSIENT HEAT ABSORPTION AND DELAYED DISSIPATION BY HIGH HEAT CAPACITY MATERIAL

CROSS-REFERENCE TO RELATED APPLICATIONS

This application claims benefit or priority from U.S. provisional application 62/447,601, filed on Jan. 18, 2017, incorporated by reference.

BACKGROUND

(a) Field

The subject matter disclosed generally relates to heat storage. More specifically, it relates to an apparatus for absorbing and dissipating heat in a HVAC setting.

(b) Related Prior Art

Some devices are marketed as devices used to store heat for buildings. These devices often consist of a thermal mass installed in the walls or on the roof for offsetting and dampening periodic variations of temperature such as those occurring during the day-night cycle.

Other devices comprise piping, e.g., black-colored pipes installed on the rooftop of buildings for heating water contained within the pipes and transported therethrough.

These devices are however not well suited for thermal requirements outside the usual day-night cycle. For example, they are not adapted for cooling down a building under constant warming (e.g., a data center). There is thus a need for a system better adapted to this type of requirement, i.e., a load that must be substantially continuously cooled down.

SUMMARY

According to an aspect of the invention, there is provided an apparatus for storing heat, the apparatus operating in a first environment and second environment, the apparatus comprising:
  a thermal mass for storing heat, the thermal mass having a first surface and a second surface;
  fins provided on the first surface and the second surface for accelerating heat transfer to and from the thermal mass; and
  a displacement mechanism secured to the thermal mass for translating the first surface to the first environment while excluding the second surface and its fins from the second environment, and for translating second surface to the second environment while excluding the first surface and its fins from the first environment.

According to an embodiment, the thermal mass is a bulk solid material of a high heat capacity.

According to an embodiment, the thermal mass comprises an enclosure with a fluid therein.

According to an embodiment, the fluid has a heat capacity greater than 2 kJ/kg·K.

According to an embodiment, the fluid is water.

According to an embodiment, the fluid is a mixture of water and glycol.

According to an embodiment, there is further provided a seal provided around the thermal mass for sealing the first environment and the second environment around the thermal mass.

According to an embodiment, the first environment is a duct, and the second environment is the outside.

According to an embodiment, the displacement mechanism comprises hydraulic cylinders secured to the thermal mass and to a fixed support.

According to an embodiment, the displacement mechanism comprises solenoid actuators secured to the thermal mass and to a fixed support.

According to another aspect of the invention, there is provided an apparatus for storing heat, the apparatus comprising:
  a thermal mass for storing heat, the thermal mass comprising an enclosure having a first surface and a second surface, the enclosure being hollow and sealed, the thermal mass being fixed in a first environment;
  fins provided on the first surface and the second surface for accelerating heat transfer to and from the thermal mass;
  a tank connected to the thermal mass via piping, the piping comprising a pump, the tank being provided in a second environment distinct from the first environment; and
  a fluid to be contained within any of the thermal mass and the tank, the fluid being displaced via the piping to be stored in only one of the tank or the thermal mass to release or absorb heat in only the first environment or the second environment.

According to an embodiment, the enclosure is sealed to prevent the fluid from escaping into the first environment.

According to an embodiment, the fluid has a heat capacity greater than 2 kJ/kg·K.

According to an embodiment, the fluid is water.

According to an embodiment, the fluid is a mixture of water and glycol.

According to an embodiment, the first environment is a duct, and the second environment is the outside.

According to an embodiment, the tank is located at a position higher than the thermal mass, such that moving the fluid from the tank to the thermal mass involves letting the fluid drop by gravity only without using the pump.

According to an embodiment, the thermal mass is located at a position higher than the tank, such that moving the fluid from the thermal mass to the tank involves letting the fluid drop by gravity only without using the pump.

According to another aspect of the invention, there is provided a method for transferring heat in a duct comprising:
  providing, in the duct, a thermal mass having a high heat capacity to absorb heat from an air stream of the duct, or release heat to the air stream of the duct, wherein the thermal mass has fins on a first surface and a second surface, wherein transferring the heat comprises exposing fins of only the first surface to the air stream, the fins of the first surface extending on a direction parallel to a direction of the air stream in the duct to form a channel for the air stream;
  displacing the thermal mass out of the duct to expose the thermal mass to outside, comprising exposing fins of only the second surface to the outside, to absorb heat from the outside, or release heat thereto; and
  providing a seal around the thermal mass to seal the duct from the outside around the thermal mass.

According to another aspect of the invention, there is provided a method for transferring heat in a duct comprising:
  providing, in the duct, a thermal mass comprising an enclosure to contain a fluid having a high heat capacity to absorb heat from an air stream of the duct, or release heat to the air stream of the duct, wherein the thermal mass has fins on a first surface and a second surface, wherein transferring the heat comprises exposing the fins to the air stream, the fins extending on a direction parallel to a direction of the air stream in the duct to form a channel for the air stream;

displacing the fluid from the thermal mass out to a tank located outside by pumping the fluid from the thermal mass or letting it drop from the thermal mass, to absorb heat from the outside, or release heat thereto;

displacing the fluid back to the thermal mass out from the tank by letting it drop from the tank or pumping the fluid from the tank.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The apparatus described herein is adapted to store thermal energy at a first location for eventual delivery at a second location (generally different from but close to the first location, where the term "close" means within the same building or facility), e.g., for storing thermal energy in HVAC ducting for eventual dissipation in the outdoor environment.

Figure 1A:
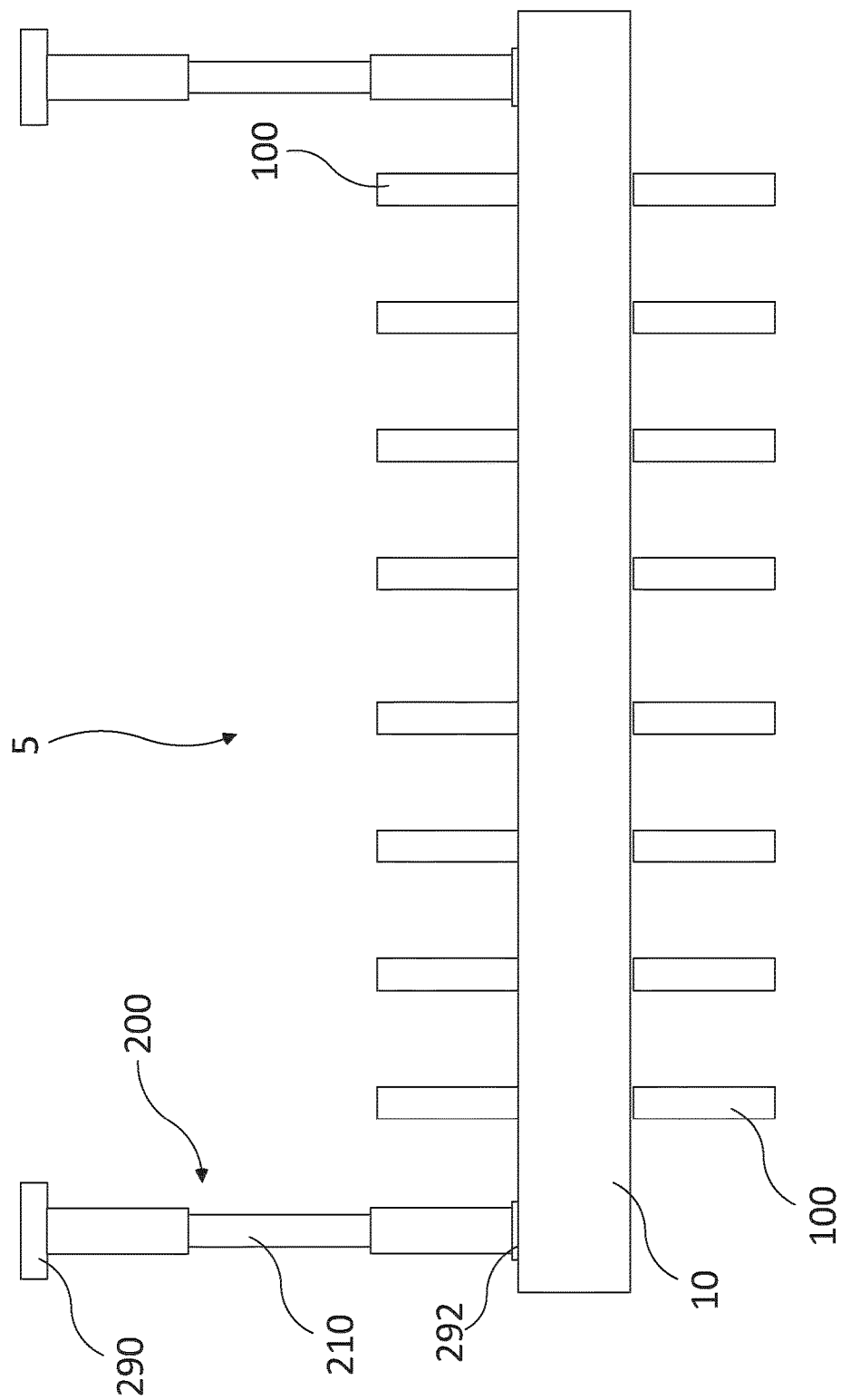
FIG. 1A is a side view illustrating an apparatus for storing heat, according to an embodiment.
Figure 1B:
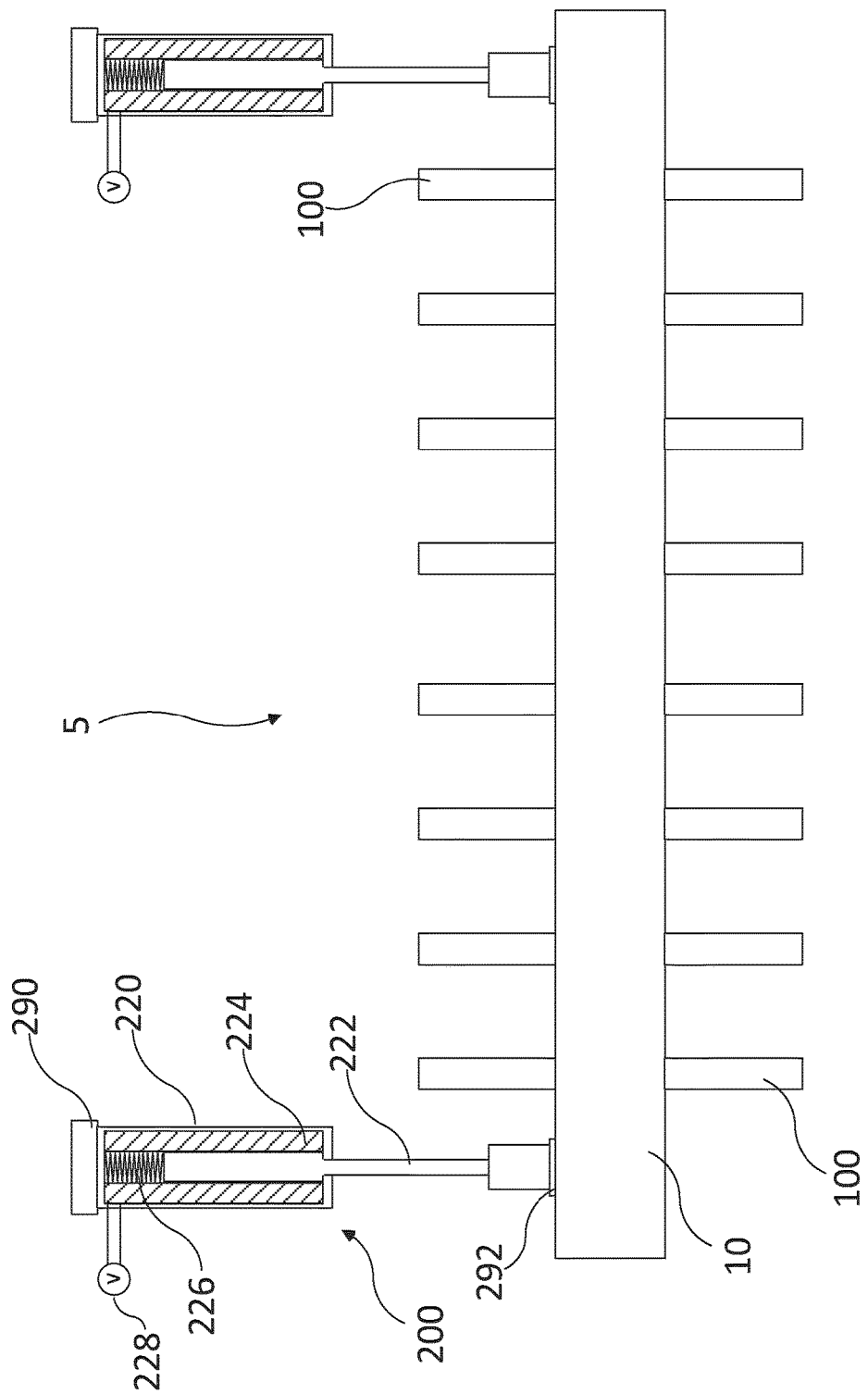
FIG. 1B is a cross-section view illustrating an apparatus for storing heat, according to another embodiment.
Figure 2:
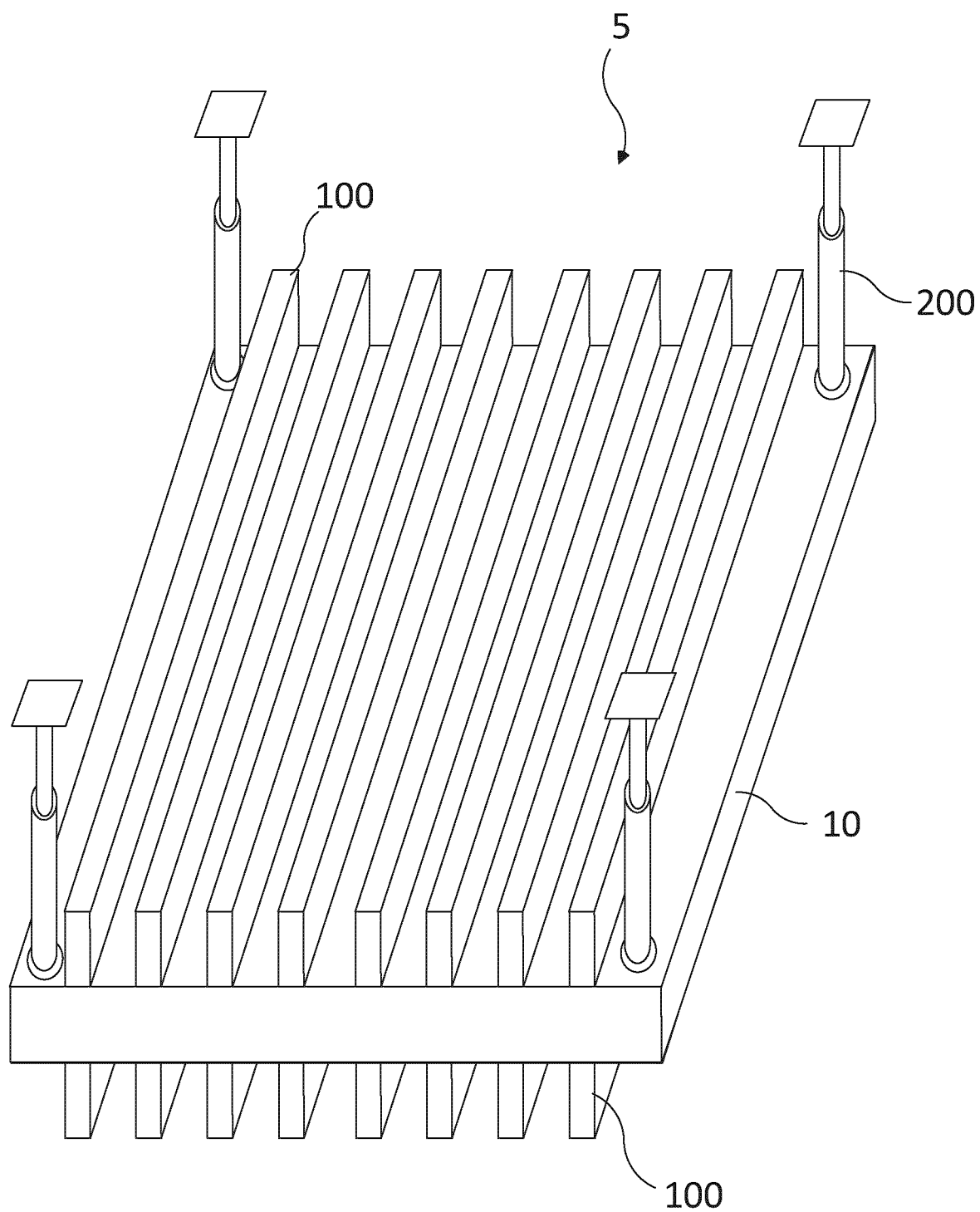
FIG. 2 is a perspective view illustrating the apparatus of FIG. 1A.

FIGS. 1A, 1B and 2 show an apparatus 5 comprising a thermal mass 10, i.e., a mass of a material having a preferably high heat capacity. The thermal mass 10 is used for heat storage; it can further absorb heat to be stored or release heat that was stored. The apparatus 5 is displaceable between an internal position (e.g., the first location where it is substantially exposed only to a first environment) and an external position (e.g., the second location where it is substantially exposed only to a second environment), with respect to a duct 500 (i.e., the first environment), to respectively provide thermal contact between the thermal mass 10 and the air stream within the duct 500 (i.e., to make a contact allowing heat transfer), and to remove the thermal mass 10 from contact with the air stream (i.e., to remove the contact that would allow heat transfer, thus preventing the heat transfer). The heat transfer could take place by conduction from the exposed surface of the thermal mass 10 which contacts the air mass, by convection of the air mass which moves about the thermal mass 10, and by radiation from the surface of the thermal mass 10, Since the air mass is a stream (i.e., there is a fluid flow), it is likely that convection is the main way of heat transfer.

The main portion of the apparatus 5 is a thermal mass 10. The thermal mass 10 is preferably bulky, i.e., a bulk material of a significant mass, in order to store a greater amount of thermal energy from the environment in which it lies.

According to an embodiment, the thermal mass 10 is a solid bulk material with high heat capacity. Few stable solid materials have a heat capacity over 1 kJ/kg·K. Paraffin wax is an example of a solid material with a very high heat capacity (for a solid) of about 2.5 kJ/kg·K. Otherwise, a heat capacity of more than 0.8 kJ/kg·K, or preferably 1 kJ/kg·K, can be considered high for a solid.

According to another embodiment, the thermal mass 10 is a solid enclosure comprising a fluid (usually a liquid) with high heat capacity. The material forming the enclosure should preferably have high heat capacity too (although it is less critical since most of the mass should be formed by the fluid), as well as a high thermal conductivity to conduct heat efficiently (i.e., at a high rate) to the fluid therein. For example, a metal would be an appropriate material for the enclosure as it would have a high thermal conductivity to transfer heat to/from the fluid therein. Although metals do not typically have a high heat capacity, the high thermal conductivity of the metal would be a appropriate trade-off as it would transfer heat at a high rate to/from the fluid which would have a high thermal capacity. The enclosure should be sealed to avoid the fluid to escape into the duct or into the atmosphere.

According to a more specific embodiment, the fluid further has a boiling point or melting point within the temperature range of operation of the apparatus 5 in order to provide latent heat absorption and storage (or latent heat release and dissipation) during a phase transition of the fluid in the thermal mass 10 that would occur when the apparatus 5 is being operated to either store or dissipate thermal energy.

Providing the thermal mass 10 as a solid bulk material is advantageous in that it is simple to manufacture and to operate. Providing the thermal mass 10 as an enclosed fluid is more complicated to manufacture and generates issues about fluid confinement, but liquids can provide convection within the thermal mass 10, inside the enclosure, which accelerates heat transfer within the thermal mass 10. The possibility of using latent heat for heat storage also increases the heat storage capacity of the thermal mass 10.

According to an embodiment, the fluid in the thermal mass 10 comprises water. According to another embodiment, the fluid in the thermal mass 10 comprises a mixture of water and glycol. This mixture can have the composition of both compounds adjusted in order to select the appropriate boiling point of the resulting mixture. For a given environment (e.g., a building), simulations can be run to identify which is the boiling point that minimizes energy consumption, or the one that minimizes the sizing of HVAC equipment, or minimizes the overall cost, for example; the exact proportion of water and glycol is then chosen accordingly. In this example, water has a heat capacity of about 4.18 kJ/kg·K. For glycol, heat capacity can vary depending on which type (e.g., ethylene or propylene glycol) and also on temperature. For example, ethylene glycol at room temperature has a heat capacity of about 2.5 kJ/kg·K. The fluid in the thermal mass 10 should thus have a heat capacity of more than about 2 kJ/kg·K, or preferably more than about 2.5 kJ/kg·K, to be considered as a fluid with high heat capacity.

According to an embodiment, the thermal mass 10 has a prismatic shape, generally with a rectangular base for greater simplicity in design and lower cost. The size of the thermal mass 10 can vary widely but is usually chosen to fit the space where it is installed. For example, if the thermal mass 10 is to be fitted in a HVAC duct 500, it can be a 24"×48" rectangle (about 60.5 cm×121 cm) extending in a plane parallel to the air stream, with a depth of 4" (about 10 cm). Only the 4" edge obstructs the stream, thus creating very minimal obstruction. The thermal mass 10 does not need to be limited to these dimensions; however, they are indicative of the order of magnitude of the size of the thermal mass 10 used in this context.

Advantageously, fins 100 can be provided on the surfaces of the thermal mass 10 to accelerate the heat transfer. The fins 100 offer additional contact surface where heat transfer can take place. The embodiment shown in FIG. 2 has a rather flat thermal mass and therefore no fins are provided on the edge of the thermal mass 10. However, fins 100 can be added to both large surfaces (first/bottom or second/top). Although shown as being all identical, the fins 100 on either surfaces can be different in shape, location and configuration. No symmetry between the top and bottom is required unless the environments to which the apparatus 5 is exposed in the external and internal positions are similar (i.e., two ducts from a HVAC setting).

In the case where the apparatus 5 is to be retracted onto the rooftop 600, the fins 100 exposed to the second or outdoor environment (normally the fins on the top surface of the thermal mass 10, or more generally the fins on the second surface, i.e., the surface to be exposed to the second environment) do not need to have a particular shape or configuration since the atmospheric air can flow in random directions. The fins could even be provided as rods or spikes in order to accommodate randomly oriented air flows.

Figure 3A:
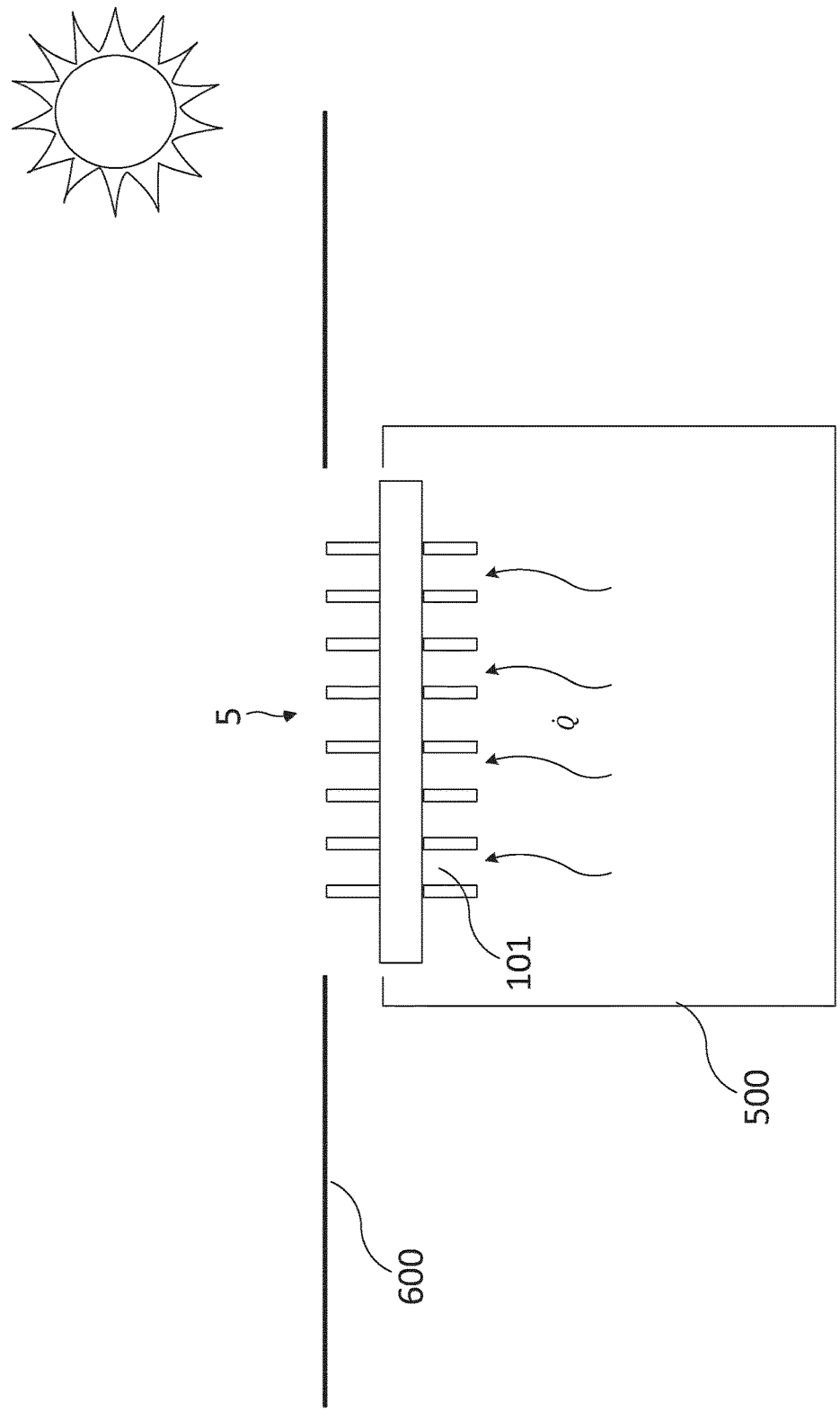
FIG. 3A is a cross-section view illustrating an apparatus for storing heat in an internal position within a section of a HVAC conduit, according to an embodiment.

However, the bottom surface, or more generally the first surface (i.e., the surface to be exposed to the first environment) exposed to an air stream of an HVAC duct 500 needs to allow an efficient air stream, considering the air stream flows in a single and constant direction, i.e., the longitudinal axis of the duct 500. The fins 100 exposed to this environment should, for example, extend longitudinally along the air flow such as to define channels 101 (free space between fins 100 defining an unobstructed passage along a direction parallel to both the surface of the surface on which the fins 100 are installed and to the plane in which the fins 100 extend) where the air is free to flow. The cross section of FIG. 3A shows the channels 101 defined between each pair of fins 100 toward which the air stream is directed and through which it can flow freely.

A displacement mechanism 200 is provided to displace the apparatus from the two (e.g., internal/external) positions at the first and second locations where the first surface is substantially exposed only to a first environment, or alternatively the second surface is substantially exposed only to a second environment. The displacement mechanism 200 needs to have a stroke length that is at least as large as the distance between the first location and the second location.

According to an embodiment, the displacement mechanism 200 comprises at least one hydraulic cylinder 210, as shown in FIG. 1A. FIG. 2 also shows that four hydraulic cylinders 210 can be provided, but this number can be decreased or increased if one prioritizes simplicity and low cost, or stability and solidity. The hydraulic cylinders 210 are a known technology that is easy to operate. They are designed to provide the one-direction translational movement needed to insert the apparatus 5 into the duct 500 or remove it therefrom.

According to another embodiment, the displacement mechanism 200 comprises at least one solenoid actuator 220, as shown in FIG. 1B. The purpose, number and configuration of the solenoid actuator(s) 220 are similar to those in the embodiment with hydraulic cylinder(s) 210.

The solenoid actuator 220 can be designed in many variants, but usually includes a plunger 222 that moves according to a one-direction translational movement within a coil 224 of the solenoid actuator 220. The coil 224 is electrically connected to a signal generator 228 (e.g., an AC generator) which can be turned on or off in order to change the magnetic field in which the plunger 222 lies. The plunger 222 should be made of a ferromagnetic material, or any equivalent thereof, to be actuated up and down within the coil 224. A spring 226 can be added above the plunger 222 to force the plunger 222 into a default position when the signal generator 228 is turned off.

Any other type of mechanism that offers simple yet strong enough one-direction translational movement can be used for the displacement mechanism 200.

The displacement mechanism 200 should be secured to a displacement support 290 located away (i.e., at a distance) from the apparatus 5 and relative to which the apparatus 5 is translated. The displacement support 290 should be fixed with respect to the duct 500. The displacement mechanism 200 should be secured to the apparatus 5, for example to a fixation device 292. The displacement mechanism 200 therefore directly links the displacement support 290 and the fixation device 292, and the length variation of the displacement mechanism 200 between these two extremal anchors dictates whether the apparatus 5 is in an external or an internal position.

FIG. 3A shows the apparatus 5 in an internal position within the duct 500. In this example, the air stream is in contact with the bottom surface of the thermal mass 10 and with the fins 100 of the bottom surface. The air stream is allowed to flow through the channels 101 defined between the fins 100. If the air stream in the duct 500 is warmer than the thermal mass 10 (i.e., its temperature is higher), heat transfer to the thermal mass 10 will take place. The thermal mass 10, through its bottom surface and the fins 100 provided thereon, will thereby store thermal energy that will be removed from the air stream. If this air stream later needs to be cooled down, the energy requirement for this cooling step will be reduced thanks to the thermal energy removed from the air stream by the thermal mass 10. A typical example for this situation would be a data center where the HVAC system is constantly used for cooling down the air supplied to server room.

Figure 3B:
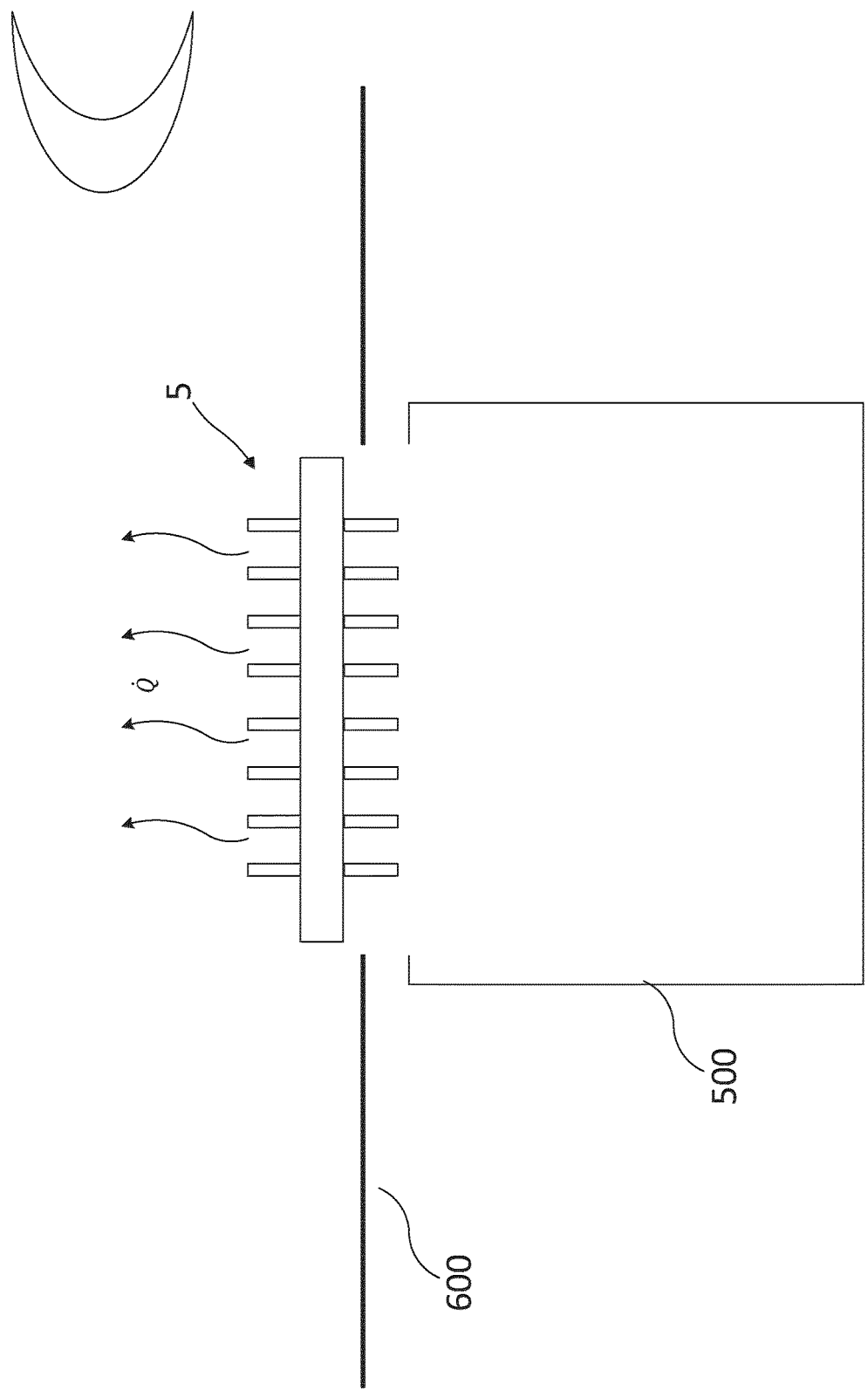
FIG. 3B is a cross-section view illustrating an apparatus for releasing heat in an external position outside a section of a HVAC conduit, according to an embodiment.

FIG. 3B shows the apparatus 5 in an external position with respect to the duct 500. In this case, the apparatus 5 is retracted onto the rooftop 600 where its top surface is exposed to the outside environment (i.e., outdoors, in free atmosphere subject to the weather). If the outside environment above rooftop 600 is cooler than the thermal mass 10 (i.e., its temperature is lower), heat transfer from the thermal mass 10 to the outside environment will take place. The thermal mass 10, through its top surface and the fins 100 provided thereon, will thereby release thermal energy that will be given to the outside environment, away from the HVAC systems and the building. The thermal mass 10 will thus be back to a lower temperature thanks to the thermal energy it released to the outside environment so that heat storage inside the duct 500 can take place later.

Figure 4A:
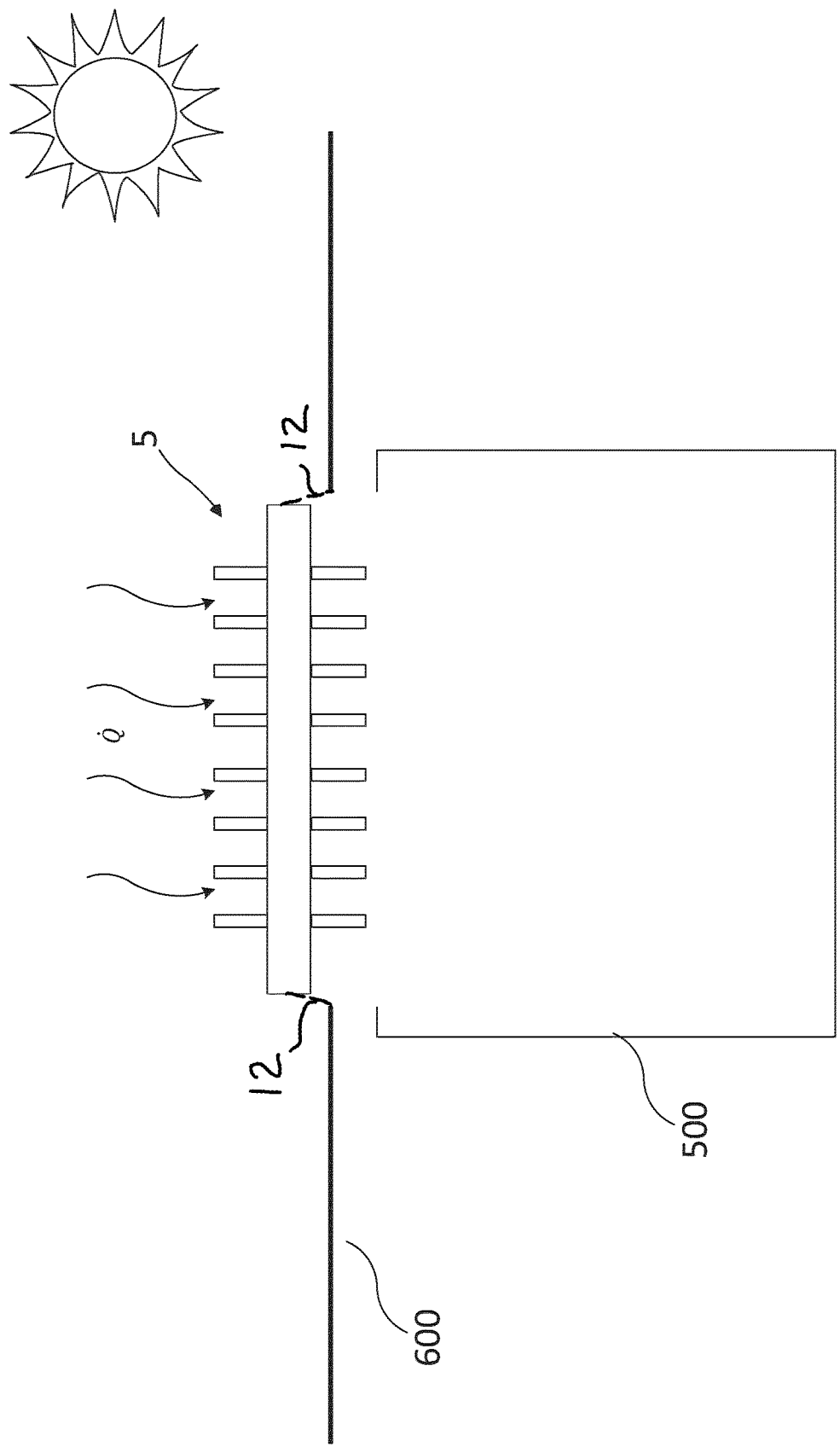
FIG. 4A is a cross-section view illustrating an apparatus for storing heat in an external position outside a section of a HVAC conduit, according to an embodiment.
Figure 4B:
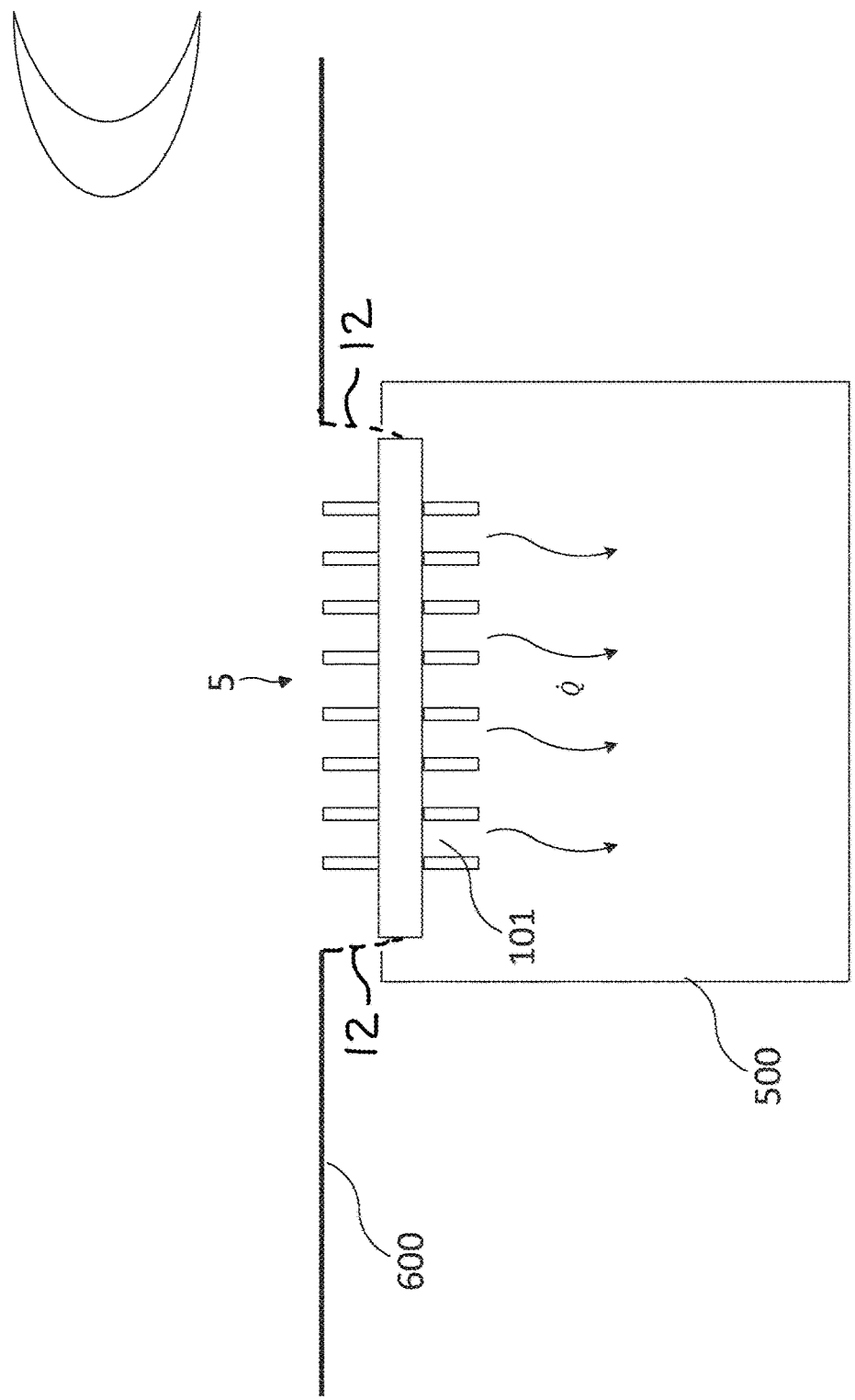
FIG. 4B is a cross-section view illustrating an apparatus for releasing heat in an internal position within a section of a HVAC conduit, according to an embodiment.
Figure 5A:
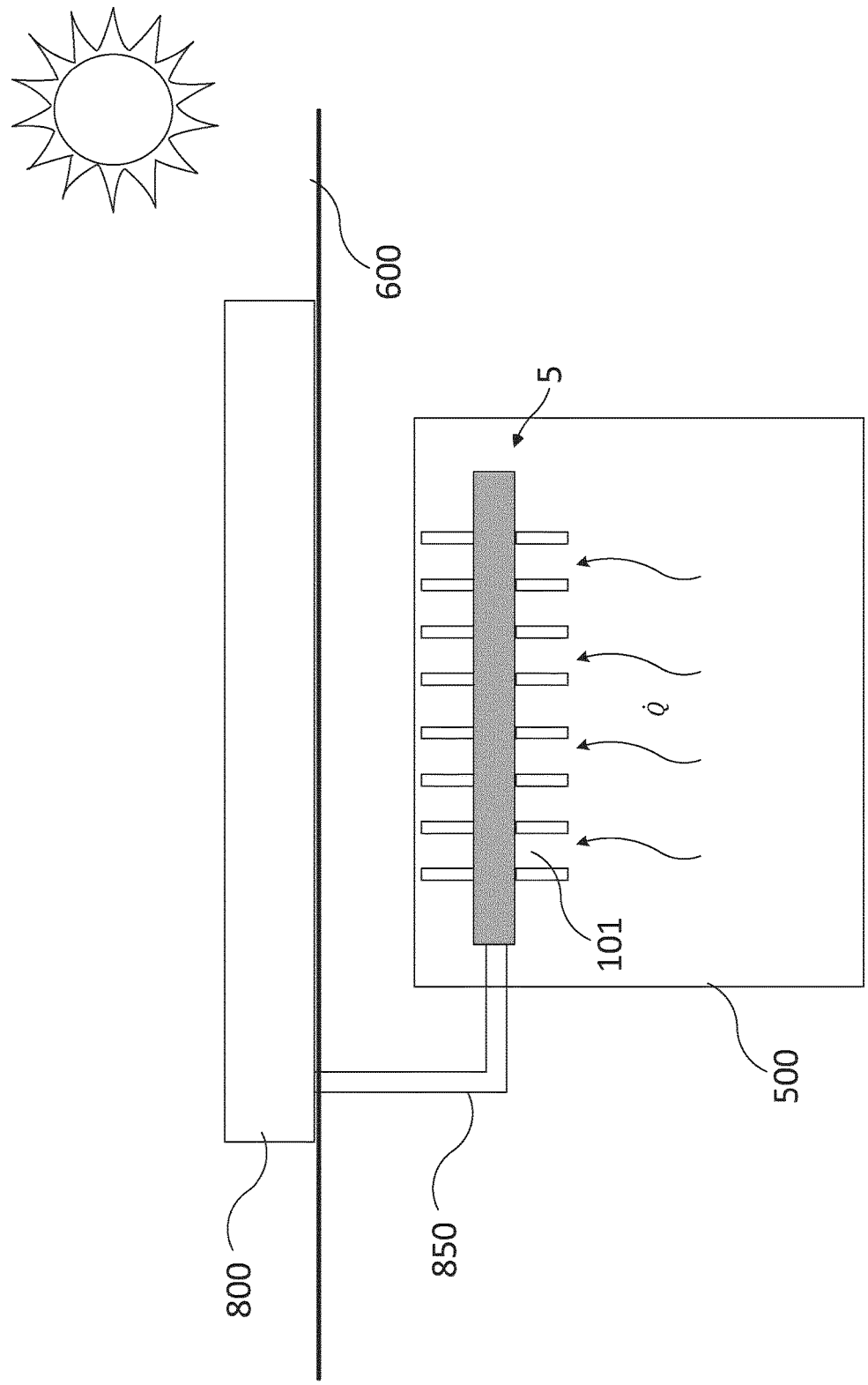
FIGS. 5A to 6B are cross-section views illustrating another embodiment of an apparatus, used in the same manner as the apparatus of FIGS. 3A to 4B, respectively.
Figure 5B:
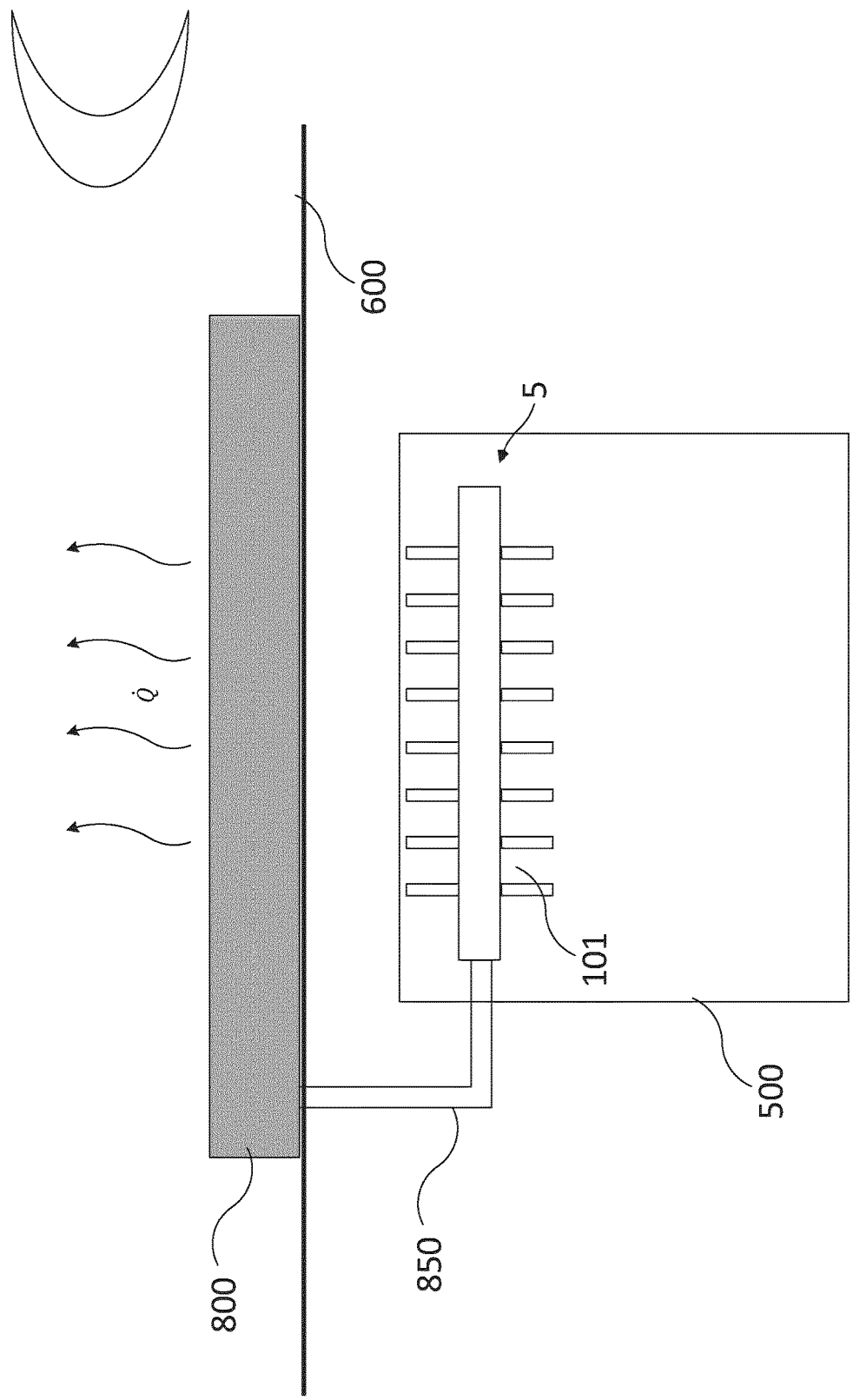
Figure 6A:
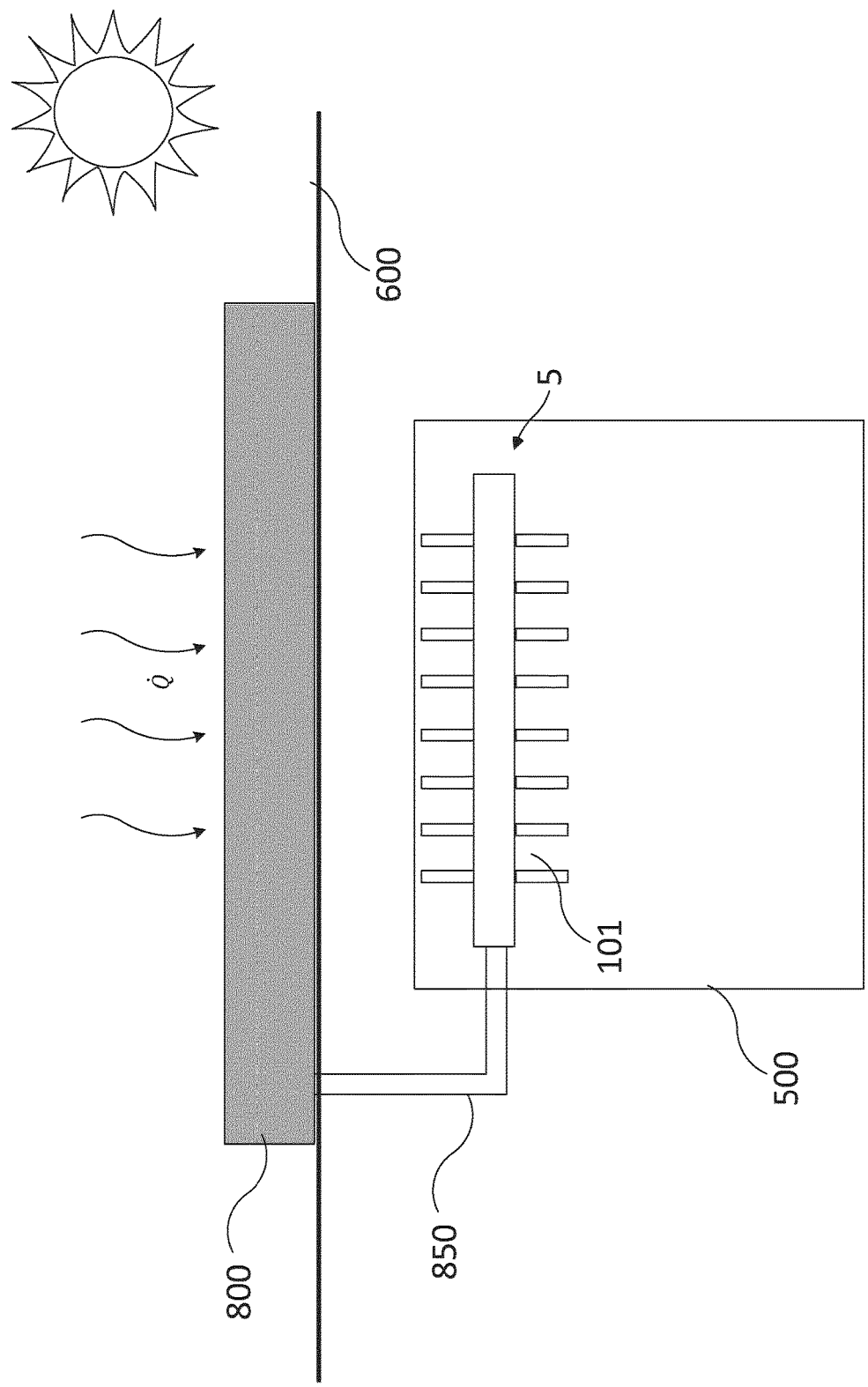
Figure 6B:
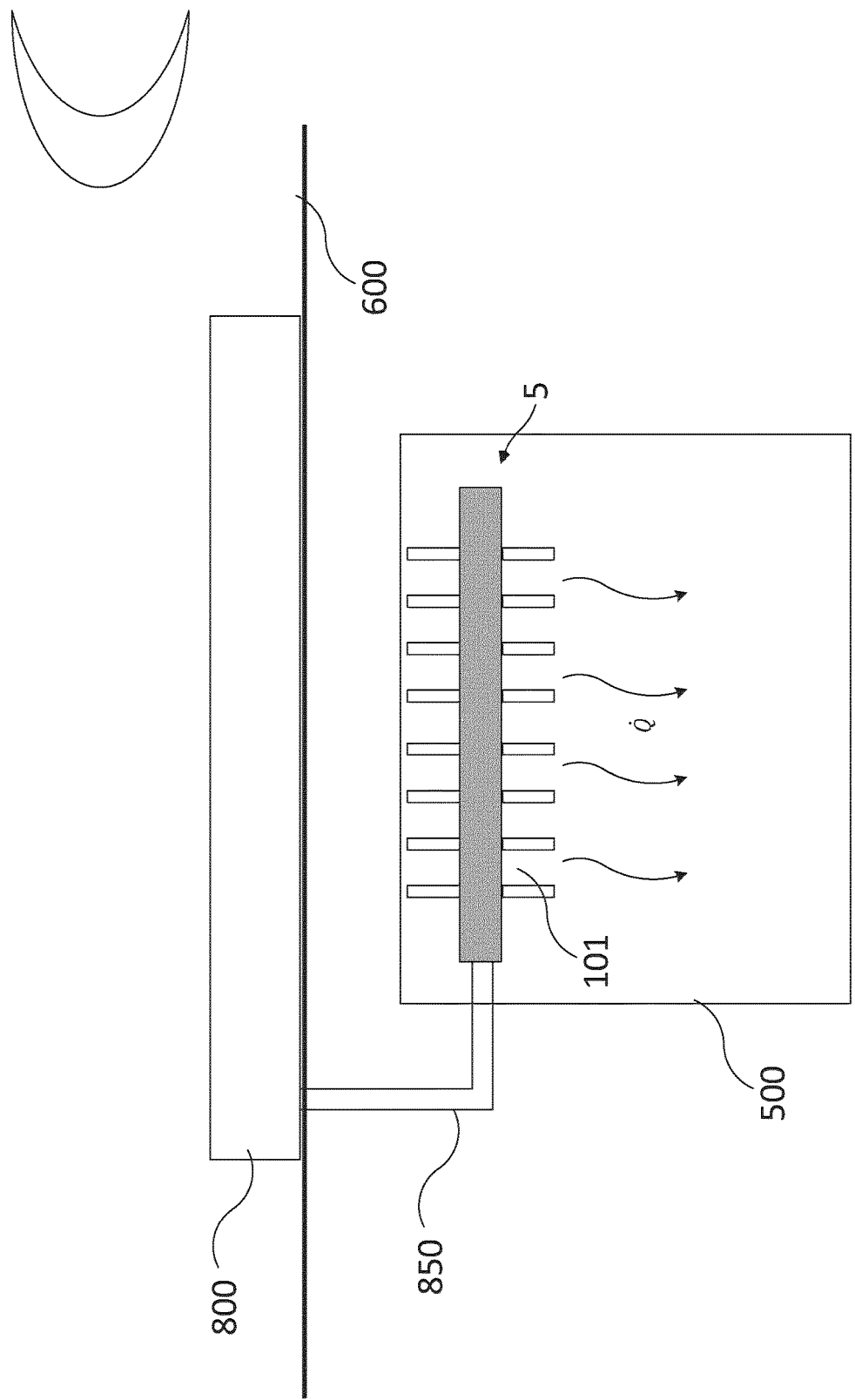

FIGS. 4A and 4B illustrate the opposite situation, where heat is absorbed by the thermal mass 10 during the day, when the apparatus 5 is in external position, and eventually released within the duct 500 at night, when the apparatus 5 is in internal position. If the outside environment above rooftop 600 is warmer than the thermal mass 10 (i.e., its temperature is higher), heat transfer to the thermal mass 10 will take place (FIG. 4A). The thermal mass 10, through its top surface and the fins 100 provided thereon, will thereby absorb thermal energy from the outside environment to inject it into the HVAC systems and the building if warming of the building is needed. The thermal mass 10 will thus reach a higher temperature thanks to the thermal energy it absorbed from the outside environment so that heat release inside the duct 500 can take place later.

If the air stream in the duct 500 is cooler than the thermal mass 10 (i.e., its temperature is lower), heat transfer from the thermal mass 10 to the air stream will take place (FIG. 4B). The thermal mass 10, through its bottom surface and the fins 100 provided thereon, will thereby release thermal energy that will be given to the air stream. If this air stream later needs to be warmed up, the energy requirement for this warming step will be reduced thanks to the thermal energy released to the air stream by the thermal mass 10.

The apparatus 5 can also be used in other contexts. For example, the thermal mass 10 can be displaceable between a first duct used for air return and a second duct used for air supply into the building. The apparatus 5 could thus be used to make originally-cold supplied air more temperate or cooling down return air, depending on whether the top or the bottom surface (and corresponding fins 100) of the thermal mass 10 is applied to the first or second duct while the other surface is removed from its corresponding duct.

In most uses of the apparatus 5, it is preferred if a given surface (top or bottom) and the corresponding fins 100 are always applied to the same environment (specific duct or the outside environment) and, if not applied thereto, simply retracted from this environment into a neutral "in-between" environment where no substantial heat transfer occurs through that surface. In other words, when the thermal mass 10 is applied to a duct 500, only one surface (e.g., the bottom surface as shown in FIG. 3A) is open to the air stream in the duct 500, while the other surface (i.e., the top surface and its corresponding fins 100) is not in contact with the air stream in the duct 500, nor is it in contact with the outside environment. It is withdrawn (or excluded) from both environments and no substantial heat transfer occurs through the top surface in this example. Conversely, as shown in FIG. 3B, when the top surface and its corresponding fins 100 are applied to the outside environment, heat transfer takes place only through this surface and the other (bottom) surface (including the corresponding fins 100) is withdrawn from the duct 500 and is not open to the outside environment. This ensures that both environments remain confined one with respect to the other, especially to avoid dust and other contaminants to cross from one environment to the other (i.e., from the outside to the clean ducts). The contour of the thermal mass 10 should be tight enough to avoid the passage of such contaminants. Advantageously, the thermal mass 10 is fitted into this contour tight enough to make this contour substantially airtight and avoid cold or hot air from an environment to be drawn into the other environment. A seal 12 can be added, for example a rubber or polymer contour or skirt that connects to the thermal mass 10 and to the surroundings in which the thermal mass 10 is housed, thus providing the seal.

FIGS. 5A-6B show another embodiment of the apparatus 5 without any displacement mechanism 200. Instead, the thermal mass 10 is an enclosure comprising a fluid, and a pump 850 is provided to inject the fluid into the enclosure or extract the fluid from the enclosure. The thermal mass 10 remains in its own location, e.g., the internal location within the duct 500 as shown in FIGS. 5A-6B, and does not move since there is no displacement mechanism 200.

In this embodiment, a reservoir or tank 800 is also provided in the external location, e.g., on the rooftop 600. The tank 800 is in fluid communication with the enclosure for the thermal mass 10. The fluid making up the bulk of the thermal mass 10 is therefore movable between the fixed enclosure of the thermal mass 10 within the duct 500 and the tank 800 located in an outside location, thanks to the pump 850 and the corresponding piping. Like the thermal mass 10, the tank 800 should have an enclosure with high thermal conductivity.

It should be noted that other forces, such as the weight of the fluid, could be used to move the fluid from one location to another (e.g., the fluid may be pushed downwardly or simply being let drop downwardly under the force of gravity from the tank 800 on the rooftop 600 into the piping to the enclosure of the thermal mass 10 within the duct 500, while the pump 850 could be used to pump the fluid upwardly through the piping). Having the tank located higher than the thermal mass 10 for the gravity-only movement of the fluid would be appropriate. The reverse (i.e., the thermal mass 10 located higher than the tank) would also be appropriate, although less practical since the tank would be expected to be on the rooftop (but it can still be on the ground instead).

Heat absorption or release therefore only take place with the first environment or the second environment at a time (excluding the temporary transition between both states when the fluid is being pumped or dropped into the other reservoir).

This alternative embodiment allows removing mobile parts in the apparatus 5. It further allows placing the thermal mass 10 and fins 100 completely inside the duct 500 (and not only the half thereof) since no airproof or dustproof seals are needed in this case because the thermal mass 10 does not move. The absence of seals and mechanisms simplifies the apparatus 5, while the possibility to place the thermal mass 10 and fins 100 completely inside the duct 500 allows for a greater thermal transfer.

FIGS. 5A-6B show embodiments where heat transfer occurs as in FIGS. 3A-4B, respectively.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. An apparatus for storing heat, the apparatus operating in a first environment and second environment, the apparatus comprising:
   a thermal mass for storing heat, the thermal mass having a first surface and a second surface;
   fins provided on the first surface and the second surface for accelerating heat transfer to and from the thermal mass, providing additional contact surface to the thermal mass for the heat transfer; and a displacement mechanism secured to the thermal mass, the displacement mechanism comprising an actuator which is electrically actuated or hydraulically actuated, wherein the actuator is controllable for:
- translating the first surface to the first environment, said translating the first surface comprising removing the second surface and the fins of the second surface from the second environment, and
- translating the second surface to the second environment, said translating the second surface comprising removing the first surface and the fins of the first surface from the first environment.

2. The apparatus of claim 1, wherein the thermal mass is a bulk solid material having the heat capacity greater than 2 kJ/kg·K.

3. The apparatus of claim 1, wherein the thermal mass comprises an enclosure with a fluid therein.

4. The apparatus of claim 3, wherein the fluid is water.

5. The apparatus of claim 3, wherein the fluid is a mixture of water and glycol.

6. The apparatus of claim 1, further comprising a seal provided around the thermal mass for sealing the first environment and the second environment around the thermal mass.

7. The apparatus of claim 6, wherein the first environment is a duct, and the second environment is outdoors.

8. The apparatus of claim 1, wherein the displacement mechanism comprises hydraulic cylinders secured to the thermal mass and to a fixed support.

9. The apparatus of claim 1, wherein the displacement mechanism comprises solenoid actuators secured to the thermal mass and to a fixed support.

10. A method for transferring heat in a duct comprising:
- providing, in the duct, a thermal mass having a heat capacity greater than 2 kJ/kg·K to absorb heat from an air stream of the duct, or release heat to the air stream of the duct, wherein the thermal mass has fins on a first surface and a second surface, wherein transferring the heat comprises exposing fins of only the first surface to the air stream, the fins of the first surface extending on a direction parallel to a direction of the air stream in the duct to form a channel for the air stream;
- displacing the thermal mass out of the duct by actuating, electrically or hydraulically, a displacement mechanism which is secured to the thermal mass, the actuating being controllable to perform a translation of the thermal mass to which the displacement mechanism is secured to expose the thermal mass to outdoors, comprising exposing fins of only the second surface to the outdoors, to absorb heat from the outdoors, or release heat thereto, the displacing the thermal mass out of the duct comprising displacing the second surface with the fins; and
- providing a seal around the thermal mass to seal the duct from the outdoors around the thermal mass.

* * * * *